United States Patent
Dumoulin et al.

(10) Patent No.: US 10,833,715 B2
(45) Date of Patent: Nov. 10, 2020

(54) EMBEDDED SUBSCRIBER IDENTITY MODULE INCLUDING COMMUNICATION PROFILES

(71) Applicant: IDEMIA FRANCE, Colombes (FR)

(72) Inventors: Jérôme Dumoulin, Colombes (FR); Tomasz Wozniak, Colombes (FR)

(73) Assignee: IDEMIA FRANCE, Colombes (FR)

( * ) Notice: Subject to any disclaimer, the term of this patent is extended or adjusted under 35 U.S.C. 154(b) by 0 days.

(21) Appl. No.: 16/064,956

(22) PCT Filed: Dec. 20, 2016

(86) PCT No.: PCT/FR2016/053572
§ 371 (c)(1),
(2) Date: Jun. 21, 2018

(87) PCT Pub. No.: WO2017/109381
PCT Pub. Date: Jun. 29, 2017

(65) Prior Publication Data
US 2019/0007082 A1  Jan. 3, 2019

(30) Foreign Application Priority Data
Dec. 22, 2015  (FR) ...................................... 15 63129

(51) Int. Cl.
*H04W 8/18*  (2009.01)
*H04B 1/3816*  (2015.01)
(Continued)

(52) U.S. Cl.
CPC .......... *H04B 1/3816* (2013.01); *H04W 8/183* (2013.01); *H04W 8/20* (2013.01); *H04W 8/205* (2013.01); *H04W 88/06* (2013.01)

(58) Field of Classification Search
CPC ...... H04B 1/3816; H04W 8/183; H04W 8/20; H04W 88/06
See application file for complete search history.

(56) References Cited

U.S. PATENT DOCUMENTS

2015/0349826 A1* 12/2015 Li .......................... H04W 8/183
455/558
2015/0350878 A1  12/2015 Li et al.
2017/0077975 A1  3/2017 Wang et al.

FOREIGN PATENT DOCUMENTS

EP  2 884 712 A1  6/2015
EP  2908561 A1  8/2015
WO  2015/176304 A1  11/2015

OTHER PUBLICATIONS

International Search Report and Written Opinion dated Apr. 11, 2017, International Application No. PCT/FR2016/053572, 10 pages, (English translation of ISR only).

(Continued)

*Primary Examiner* — Marcus Hammonds
(74) *Attorney, Agent, or Firm* — MH2 Technology Law Group, LLP

(57) ABSTRACT

An embedded subscriber identity module (eUICC1), which includes communication profiles, and that co-operates with a communications terminal (T). The module includes at least two communication profiles (P) that are active at the same time so as to allow the communications terminal to communicate with each mobile telephone network (R1, R2) associated with the active communication profiles, a receive module for receiving, from the terminal (T), a command (CMD) that has one of the active communication profiles as its destination (P), (referred to as the destination profile), and a determination module for determining the destination profile from among the active communication profiles on the basis of a destination profile identifier included in the command.

13 Claims, 4 Drawing Sheets

(51) Int. Cl.
*H04W 8/20* (2009.01)
*H04W 88/06* (2009.01)

(56) References Cited

OTHER PUBLICATIONS

Office Action with issued in corresponding Japanese Patent Application No. 2018-532759 dated Aug. 11, 2020 with English language translation, 10 pages.

\* cited by examiner

EMBEDDED SUBSCRIBER IDENTITY MODULE INCLUDING COMMUNICATION PROFILES

CROSS-REFERENCE TO RELATED APPLICATIONS

This application is a U.S. National Stage application of International Application No. PCT/FR2016/053572 filed 20 Dec. 2016, which claims priority to French Application No. 1563129 filed 22 Dec. 2015, the entire disclosures of which are hereby incorporated by reference in their entireties.

BACKGROUND OF THE INVENTION

The present invention relates to the field of embedded subscriber identity modules, also known as embedded universal integrated circuit chips (eUICCs), and it relates more particularly to such eUICC modules suitable for appropriately managing a plurality of communication profiles.

In known manner, a conventional SIM card is configured to enable a communications terminal (e.g. such as a cell phone) with which it co-operates to use the communications network of only one network operator. For this purpose, the SIM card contains subscription data such as, for example: an international mobile subscriber identity (IMSI); cryptographic keys; and algorithms specific to the associated operator. The subscription data is stored permanently in a read only memory (ROM) of the SIM card.

When a cell phone attempts to use the services of a cell phone network, it sends all of the subscription data stored in the SIM card that is needed by the network operator in order to obtain access to the required services. The operator can thus identify the user and make use of a home location register (HLR) database to verify that the user has indeed subscribed to the requested service. If so, the operator then allows access to the cell phone having embedded therein the SIM card with the data that was used for authenticating and registering the telephone with the operator network.

Furthermore, reprogrammable SIM cards are now known, and more particularly embedded subscriber identity modules or eUICC modules. These reprogrammable modules enable a user to change operator without needing to physically replace the SIM card in the cell phone. The main specifications for an eUICC module are defined by the global system for mobile communications association (GSMA) in the standard GSMA SGP.02 v3.0 entitled "Remote provisioning architecture for embedded UICC—technical specification—version 3.0" dated Jun. 30, 2015. An eUICC module is a secure hardware element of small size that can be integrated in a cell phone so as to perform the functions of a traditional SIM card.

In particular, an eUICC module is suitable for containing a plurality of communication profiles (also referred to below just as "profiles"). Each profile is contained in a dedicated secure domain referred to as "ISD-P" in that GSMA standard. When a communication profile is active, it enables the cell phone to access in secure manner the communications network of an associated operator, and also the services that are defined by the profile in question. By changing the communication profile in the eUICC module that is active, it is possible to change operator or to modify access to associated services (e.g. data and/or voice services).

Nevertheless, when an eUICC module has a plurality of communication profiles, it is necessary to deactivate one profile when it is desired to activate another. To do this, the SM-SR server in charge of the life cycle of the profiles loaded within an eUICC module sends requests via the cell phone network, e.g. to activate or deactivate the profile in question in the eUICC.

When a communication profile is activated in the eUICC module, the operator, who is the proprietor of and responsible for said active communication profile, is generally caused to perform management and/or maintenance operations on the content of the active profile by using a remote server. By way of example, these operations may be updating data in the file system of the profile, or indeed, for example, installing or deinstalling new applications in the active profile.

At present, there exists a need for improving the management of the content of a communication profile in an eUICC module co-operating with a communications terminal.

OBJECT AND SUMMARY OF THE INVENTION

To this end, the present invention provides an embedded subscriber identity module (or eUICC module) suitable for co-operating with a communications terminal, the module comprising:

a plurality of communication profiles, at least two of said communication profiles being active at the same time so as to allow the communications terminal to communicate with each mobile telephone network associated with said at least two active communication profiles;

a receive module for receiving, from the communications terminal, a command that has one of the active communication profiles as its destination, referred to as the destination profile; and a determination module for determining the destination profile from among the active communication profiles on the basis of a destination profile identifier included in said command.

For each command received by an eUICC module, the present invention makes it possible to determine the active communication profile that is the destination for said command. By means of the invention, an eUICC module can thus maintain a plurality of profiles in the active state, each of the profiles being suitable for receiving and processing the commands having those profiles as their destination. In this way, it is possible to activate a plurality of profiles at the same time and to avoid mobile network operators sending activation and deactivation requests, thereby limiting traffic and network resources.

In a particular embodiment, the embedded subscriber identity module includes a processor module for directing (or sending) the command to said destination profile. It is thus possible to switch each command to the appropriate active profile.

In a particular embodiment, the communications terminal has at least one radio interface, at least one of the active communication profiles having access to said at least one radio interface in order to enable communication to be set up between the communications terminal and the mobile telephone network associated with said active communication profile.

In a particular embodiment, said command is an APDU command in compliance with the standard ISO 7816-4, and wherein the identifier of the destination profile is included in the CLA class octet as defined in the standard ISO 7816-4.

In a particular embodiment, the identifier of the destination profile is coded on the basis of bit 5 of the CLA class octet.

In a particular embodiment, bit 5 of the CLA class octet can switch between a first state and a second state, the determination module being configured to determine that a first active communication profile in the embedded subscriber identity module is the destination of said command when the bit 5 is in the first state, and to determine that a second active communication profile in the embedded subscriber identity module is the destination of said command when bit 5 is in the second state, said first and second active communication profiles being distinct from each other.

In a particular embodiment, the identifier of the destination profile is coded on the basis of bits 1 and 2 of the CLA class octet.

In a particular embodiment, bits 1 and 2 of the CLA class octet can each switch between a first state and a second state, the determination module being configured to determine the destination profile on the basis of the states in which said bits 1 and 2 are to be found in the APDU command.

The invention also provides a device suitable for sending a command to an embedded subscriber identity module co-operating with a communications terminal, the device comprising:
 a send module for sending the command to one of a plurality of communication profiles that are active at the same time in the embedded subscriber identity module, each active communication profile enabling the communications terminal to communicate with a respective mobile telephone network; and
 a processor module configured, prior to sending the command, to include an identifier of an active communication profile that is the destination for said command.

By way of example, the device may be the terminal itself or it may be a remote content management server, said terminal and the server complying with the standards GSMA SGP.02 v3.0 (referred to as the "GSMA standard" in the present disclosure). As specified in the GSMA standard, the following standards may be used for managing the content of active profiles in the context of the invention: ETSI TS 102 225 "Secured packet structure for UICC-based applications" release 12 and/or ETSI TS 102 226 "Remote APDU structure for UICC-based applications" release 9 and/or GlobalPlatform Card Specification v.2.2 Amendment B: Remote application management over http v1.1.3.

The various embodiments defined above with reference to the embedded subscriber identity module apply analogously to the device of the invention.

The invention also provides a system comprising:
 an embedded subscriber identity module as defined above;
 a communications terminal co-operating with the embedded subscriber identity module; and
 at least one device as defined above.

In an embodiment, the invention is embodied by means of software and/or hardware components. In this context, the term "module" may correspond in this document equally well to a software component or to a hardware component or to a combination of software and hardware components.

The invention also provides a signal sent by a device to an embedded subscriber identity module co-operating with a communications terminal, said embedded subscriber identity module having a plurality of active communication profiles, each active communication profile enabling the communications terminal to communicate with a respective mobile telephone network;

wherein the signal conveys a command including an identifier of a communication profile from among said active communication profiles that is the destination of said command.

Correspondingly, the invention provides a processing method implemented by an embedded subscriber identity module (or eUICC module) co-operating with a communications terminal, the method comprising the steps of:
 maintaining at least two communication profiles in the activated state at the same time, referred to as active communication profiles, whereby each active communication profile enables the communications terminal to communicate with a respective mobile telephone network associated with said communication profile;
 receiving, from the communications terminal, a command that has one of the active communication profiles as its destination, referred to as the destination profile; and
 determining the destination profile from among the active communication profiles on the basis of an identifier of the destination profile included in said command.

The various embodiments defined above with referenced to the embedded subscribe identity module apply analogously to the processing method of the invention.

The invention also provides a sending method implemented by a device for sending a command to an embedded subscriber identity module co-operating with a communications terminal, the method comprising the steps of:
 including, in a command, an identifier of a destination communication profile from among a plurality of communication profiles that are active at the same time in the embedded subscriber identity module, each active communication profile enabling the embedded subscriber identity module to communicate, via the communications terminal, with a respective mobile telephone network; and
 sending said command, to the communications terminal, to the destination of the destination communication profile from among the plurality of active profiles in the embedded subscriber identity module.

By way of example, the device may be the terminal itself or a remote content management server in compliance with the standards GSMA SGP.02 v3.0 and/or ETSI TS 102 225 "Secured packet structure for UICC-based applications" release 12 and/or ETSI TS 102 226 "Remote APDU structure for UICC-based applications" release 9 and/or GlobalPlatform Card Specification v.2.2 Amendment B: Remote application management over http v1.1.3.

In a particular embodiment, the various steps of the processing method and of the sending method are determined by computer program instructions.

Consequently, the invention also provides a computer program on a data medium (or recording medium), the program being suitable for being performed in an embedded subscriber identity module, in a device, or more generally in a computer, the program including instructions adapted to performing steps of a processing method or of a sending method as defined above.

The program can use any programming language and be in the form of source code, object code, or code intermediate between source code and object code, such as in a partially compiled form, or in any other desirable form.

The invention also provides a data medium (or recording medium) that is readable by a computer, and that includes instructions of a computer program as mentioned above.

The data medium may be any entity or device capable of storing the program. For example, the medium may comprise storage means, such as a ROM, e.g. a compact disk (CD) ROM, or a microelectronic circuit ROM, or indeed magnetic recording means, e.g. a floppy disk or a hard disk.

Furthermore, the data medium may be a transmissible medium such as an electrical or optical signal, suitable for being conveyed via an electrical or optical cable, by radio, or by other means. The program of the invention may in particular be downloaded from an Internet type network.

Alternatively, the data medium may be an integrated circuit in which the program is incorporated, the circuit being adapted to execute or to be used in the execution of the method in question.

BRIEF DESCRIPTION OF THE DRAWINGS

Other characteristics and advantages of the present invention appear from the following description made with reference to the accompanying drawings, which show embodiments having no limiting character. In the figures.

DETAILED DESCRIPTION OF EMBODIMENTS

As mentioned above, the proposed invention relates to embedded subscriber identity modules (also known as eUICC modules) and it relates more particularly to using such modules for managing a plurality of communication profiles simultaneously in co-operation with a communications terminal.

Nowadays, the standard GSMA SGP.02 v3.0 (referred to below as the "GSMA standard") imposes a constraint in that only one profile at a time can be in the active state in an eUICC module. In other words, the GSMA standard prohibits the situation in which a plurality of communication profiles are active simultaneously in an eUICC module.

Nevertheless, in particular in order to solve the problems mentioned above and in order to improve the management of communication profiles in an eUICC module, the present invention proposes enabling a plurality of profiles to be active at the same time in an eUICC module.

A profile is said herein to be "active", or in the "active" state, when a communication profile is activated in the eUICC module so as to allow the communications terminal (with which the eUICC module is co-operating) to communicate with the telephone network associated with the profile in question. In accordance with the GSMA standard, a profile (or the secure domain ISD-P in which it is contained) is said to be "active" (ENABLE) when its so-called "life cycle" state parameter is set to the state '3F'. Still according to the GSMA standard, a profile is said on the contrary to be "inactive" (DISABLE) when its "life cycle state parameter is set to the '1F' state.

As explained in greater detail below, a communication profile may be active, but without having access to the radio interface of the communications terminal. Under certain circumstances, access to the radio interface may be limited, in particular when there are not as many radio interfaces in the communications terminal as there are profiles that are active at the same time in the eUICC module. An active profile does not enable communication to be set up between the communications terminal and the mobile telephone network associated with the profile unless the profile has access to the radio resource of the communications terminal.

In conventional eUICC modules, the fact that only one profile can be active at a given instant has the consequence that it is not possible to use a plurality of cell phone subscriptions simultaneously, as is possible for example in a DUAL SIM telephone that uses two distinct SIM cards at the same time.

In order to use a plurality of subscriptions simultaneously in a given communications terminal, one solution might consist in integrating a plurality of eUICC modules in a single communications terminal. Nevertheless, such an approach presents major constraints in terms in particular of fabrication and costs.

Figure 1:
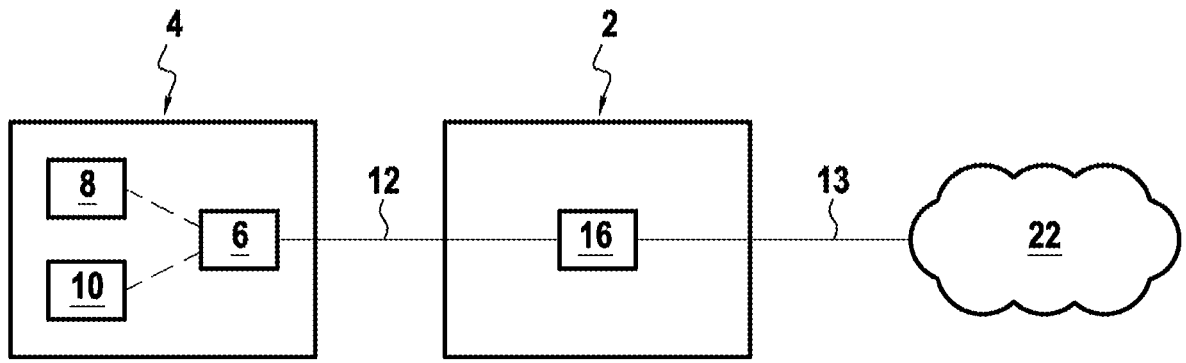
FIG. 1 is a diagram of an embedded subscriber identity module co-operating in known manner with a terminal.

FIG. 1 shows a conventional eUICC module 4 suitable for co-operating with a communications terminal 2 in order to enable a user to communicate with a mobile telephone network 22. In this example, the operating system (or OS) 6 of the eUICC module 4 is suitable for using communication profiles 8 and 10. In accordance with the above-mentioned GSMA standard, only one of the profiles 8 and 10 can be active at any given instant. The eUICC module 4 is suitable for communicating with the terminal 2 via a physical connection of the ISO 7816 type. The radio interface 16 of the terminal 2 is capable of transmitting and receiving radio communication with the outside, e.g. via an antenna (not shown). The single profile (8 or 10) that is active in the eUICC module 4 has access (via the operating system of the terminal 2) to the radio interface 16 over the connection 12 so as to enable communication 13 to be set up, which may be of the data and/or voice type, between the terminal 2 and the mobile telephone network 22 associated with the profile in question.

As mentioned above, the present invention provides for enabling a plurality of profiles to be active at the same time in an eUICC module. Nevertheless, this approach presents a difficulty in the sense that, at present, there does not exist any solution enabling an eUICC module in which a plurality of profiles might be active at the same time to manage appropriately commands received from outside the communications terminal and that are sent to one or the other of the active profiles.

In particular for the purpose of solving the above-mentioned problems, and in order to improve the management of communication profiles within an eUICC module, the present invention proposes enabling an eUICC module to determine which active profile is to be the destination of each command received via the communications terminal. To do this, the invention provides for each command that is sent to the eUICC module and that has one of the communication profiles as its destination, to include an identifier of the active profile that is the destination of said command. On the basis of this identifier, the eUICC module is thus capable of determining the destination profile, and it can advantageously direct the command to the destination profile as determined in this way.

As explained below, various embodiments or variants may be envisaged in the context of the invention. In particular, it is possible to envisage various types of identifier for including in commands in order to identify which active profile in the eUICC module is the destination.

Unless specified to the contrary, elements that are common or analogous in a plurality of figures are given the same reference signs and present characteristics that are identical or analogous, such that these common elements are generally not described again, for reasons of simplicity.

Figure 2:
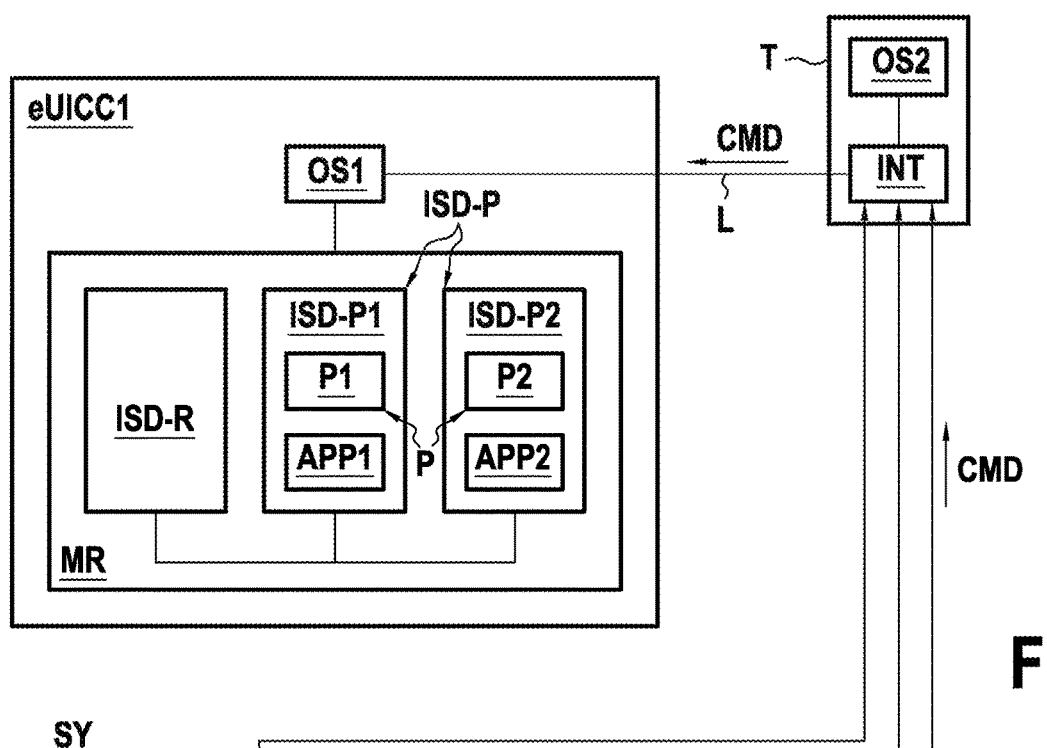
FIG. 2 is a diagram showing a terminal, an embedded subscriber identity module, and servers in a particular embodiment of the invention.
Figure 2:
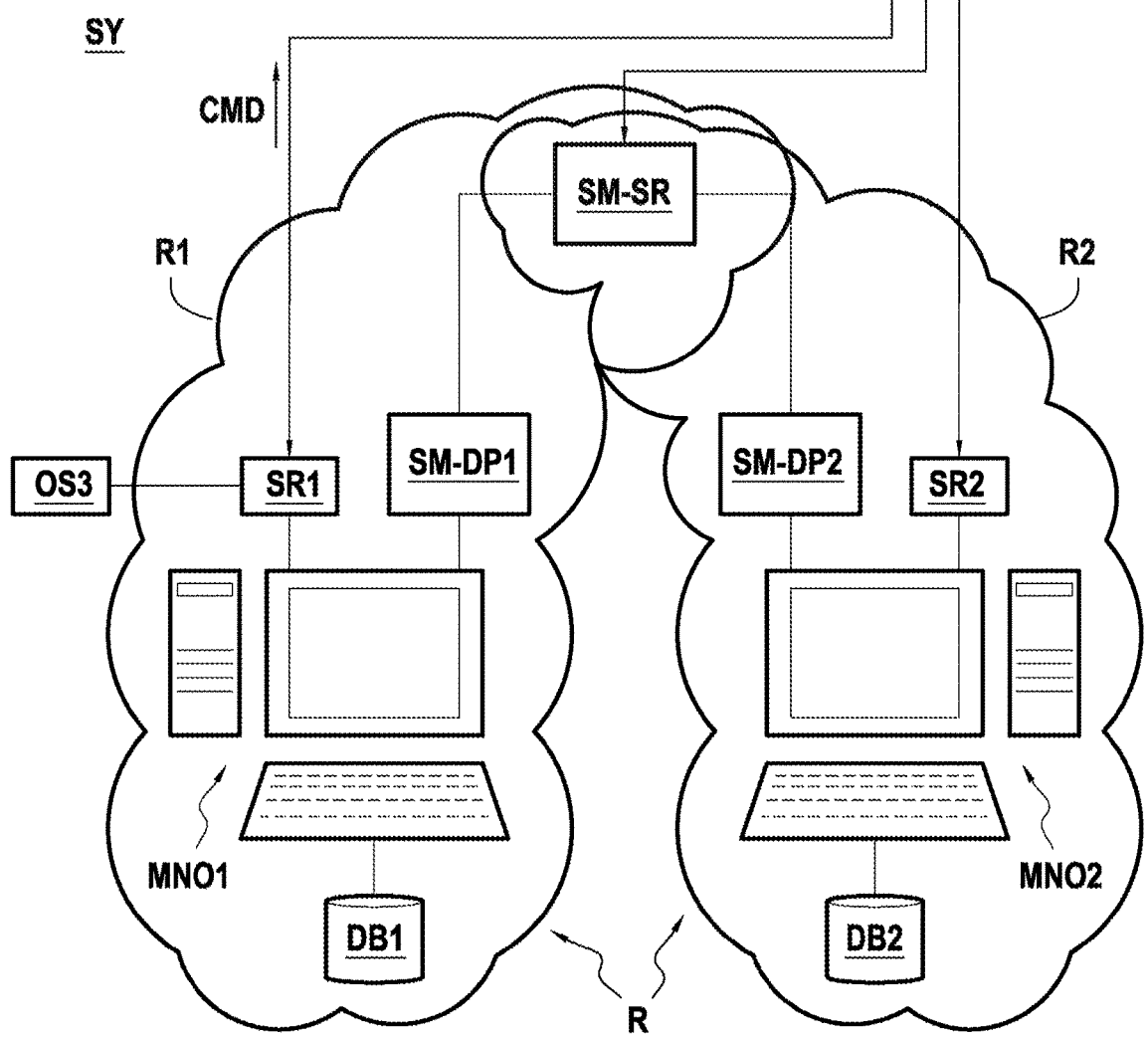

FIG. 2 is a diagram showing the structure of an eUICC module (referenced eUICC1) suitable for co-operating with a communications terminal T in order to enable access to a mobile telephone network R. By way of example, the module eUICC1 is soldered or integrated in the terminal T.

In the presently-described embodiment, the terminal T is a mobile terminal such as a cell phone, for example, but other implementations can nevertheless be envisaged within the context of the invention.

In the presently-described embodiment, the mobile terminal T may use the module eUICC1 to access in secure manner the network R1 and the network R2 (referred to collectively as R), and also the services provided by the associated network operators MNO1 and MNO2 (referred to more generally as MNO for "mobile network operator").

Figure 3A:
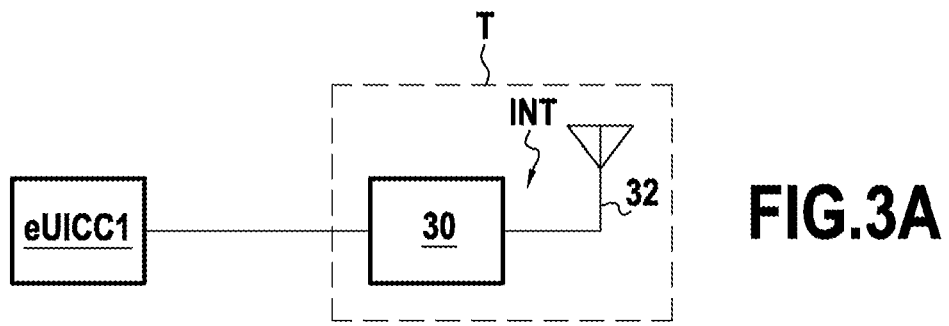
FIG. 3A is a diagram showing an embodiment of the terminal.

In this particular embodiment, the mobile terminal T has an operating system OS2 suitable in particular for controlling a radio interface INT. By way of example, and as shown in FIG. 3A, the radio interface INT comprises in known manner a radio transceiver unit 30 coupled to an antenna 32. As explained below with reference to FIG. 3B, it is also possible to envisage a plurality of radio interfaces being present in the terminal T.

In the presently-described embodiment, the module eUICC1 has an operating system OS1 (stored in a non-volatile memory, a ROM, or a flash memory, for example) that is coupled to a rewritable non-volatile memory MR.

The operating system OS1 has a certain number of modules that are described in greater detail below with reference to FIG. 4.

The operating system OS1 constitutes an example of a computer program in the meaning of the invention, the program including instructions for executing steps of a processing method in a particular embodiment of the invention. The memory in which the operating system OS1 is contained thus constitutes an example of a data medium in the meaning of the invention that is readable by a processor (not shown) of the module eUICC1.

As shown in FIG. 2, the non-volatile memory MR of the module eUICC1 also includes a privileged secure domain ISD-R, together with secondary secure domains ISD-P that are referenced ISD-P1 and ISD-P2 in this example. Each secure domain constitutes a secure compartment of the module eUICC1. It can be understood that the presently-envisaged particular embodiment constitutes merely a non-limiting example of the invention, and in particular the number of domains ISD-P may be adapted depending on usage circumstances.

The secure domain ISD-R is privileged, in particular, in that it is capable of creating, deleting, activating, or deactivating secondary secure domains ISD-P in the non-volatile memory MR.

Each secondary secure domain ISD-P is suitable for containing a single communication profile P (or operational profile) associated with a particular network operator MNO. Each profile P is thus contained in a secure domain ISD-P that is dedicated thereto. In known manner, a communication profile P includes subscription data (e.g. identifiers (IMSI, etc.), cryptographic keys, algorithms (e.g. for authentication) . . . ) and may also include a file system, applications, or indeed predetermined execution rules. In the presently-envisaged example, the profiles P comply with the GSMA standard.

More particularly, in the presently-described example, the secondary secure domain ISD-P1 includes a communication profile P1 that, when active, allows the terminal T to communicate with a first mobile network R1 associated with the mobile network operator MNO1. The secure domain ISD-P1 may also include applications APP1 specific to the operator MNO1 to which the user has subscribed. Alternatively, the applications APP1 defined for the profile P1 may be contained in the profile P1 itself.

Likewise, the secondary secure domain ISD-P2 has a communication profile P2 that, when it is active, authorizes the terminal T to communicate with a second mobile network R2 associated with a second network operator MNO2. The secure domain ISD-P2 may also have applications APP2 specific to the operator MNO2 to which the user has subscribed. Alternatively, the applications APP2 defined for the profile P2 may be contained in the profile P2 itself.

In the presently-described embodiment, the module eUICC1 is suitable for keeping a plurality of communication profiles P (specifically P1 and P2 in this example) in the active state at the same time.

The module eUICC1 is also suitable for acting via the terminal T (and in particular its radio interface INT) to communicate in secure manner with a remote subscription manager and secure routing (SM-SR) server belonging both to the network R1 and to the network R2.

Communication between the module eUICC1 and the terminal T takes place in this example over the connection L in compliance with the standard ISO 7816 (as defined more particularly in ISO 7816-3 and ISO 7816-4).

In this particular embodiment, the network R1 has a remote server SR1 for managing content that enables the operator MNO1 to manage the content of the profile P1 in the module eUICC1. Likewise, the network R2 has a remote server SR2 for managing content that enables the operator MNO2 to manage the content of the profile P2 in the module eUICC1. Once the profiles P1 and P2 are activated within the module eUICC1, the operators MNO1 and MNO2 can thus make use of their respective servers SR1 and SR2 so as to perform operations involving managing applications or files within the associated active profile.

By way of example, these remote servers SR1, SR2 are remote application management (RAM) or remote file management (RFM) type servers.

Managing the content of a profile (applications and/or files) makes it possible within that profile, by way of example and in non-limiting manner, to install new applications, to update files, to deinstall applications, to create files, to release files, . . . .

In an embodiment, in order to manage the profile P1 (or P2) the remote content management server SR1 (or SR2) is suitable for sending over the network R1 (or R2) and the terminal T commands that are specific to the profile P1 (or P2) in the module eUICC1. These specific commands, referred to as content management commands, serve to manage the files and/or applications of the profile P1 (or P2) specified in the module eUICC1. By way of non-exhaustive example, these specific commands may comprise the following APDU commands that are known to the person skilled in the art: "update record"; "delete file"; "update binary"; "install install", "select file"; . . . . Each remote server SR1, SR2 can thus use the radio interface INT of the terminal T to reach a target active profile in the module eUICC1.

In the presently-described embodiment, the server SR1 uses an operating system OS3. The operating system OS3 constitutes an example of a computer program in the meaning of the invention, this program including instructions for executing steps of a sending method in a particular implementation of the invention. The memory (not shown) in which the operating system OS3 is contained constitutes an example of a data medium in the meaning of the invention that is readable by a processor (not shown) of the remote server for managing content.

It can be understood that the remote server SR2 for managing content presents a structure and operation that are analogous to the structure and operation of the server SR1, such that the server SR2 is not described in detail in the present disclosure.

In the presently-considered example, the content management server SR1 is suitable for sending content management commands CMD to the terminal T that has one of the communication profiles P as its destination that is in the active state and under its responsibility in the module eUICC1. In order to be able to receive and process a command CMD, a communication profile P needs to be active. In this example, the secure domain ISD-R is suitable for activating a profile P in response to an activation command sent by the server SM-SR.

The commands CMD that might be received by a profile P while it is active, may be of the APDU type, for example.

In this example, and as shown in FIG. 2, the operators MNO1 and MNO2 are each capable of communicating with a respective SM-DP server (or more generally a device), referred to herein respectively as SM-DP1 and SM-DP2. In addition, in this example, each of the operators MNO1 and MNO2 has access to a respective database (DB1, DB2), each of which contains subscription data, in particular. Use in particular of the servers SM-DP1, SP-DP2 and of the databases DB1, DB2 is not necessary for performing the invention.

Each server SM-DP1 and SM-DP2 is suitable for transmitting to the server SM-SR both commands for creating profiles (creating a domain ISD-P . . . ) and also initial data for loading into a profile.

Furthermore, in accordance with the invention, the module eUICC1 is suitable for receiving commands CMD coming from remote servers SR1, SR2 for managing content and for directing those commands to the active communication profile P that is the destination for said commands CMD from among a plurality of profiles that are active in the module eUICC1.

The module eUICC1, the terminal T, and the content management servers SR1 and SR2 together form a system SY.

It can be understood that certain elements generally present in an eUICC module in a communications terminal T or indeed in a server SM-SR, or in a content management server, are voluntarily omitted since they are not necessary for understanding the present invention. In addition, the person skilled in the art understands that certain elements are described herein to facilitate understanding the invention even though they are not essential or directly involved in performing the invention.

As mentioned above with reference to FIG. 3A, the terminal T may have a single radio interface INT. Under such circumstances, only one of the profiles P that are active in the module eUICC1 is capable at any given instant of setting up communication between the terminal T and the mobile network R. Under such circumstances, when the profiles P1 and P2 are active at the same time, only one of the two profiles P can establish communication with the network of the associated operator MNO.

Figure 3B:
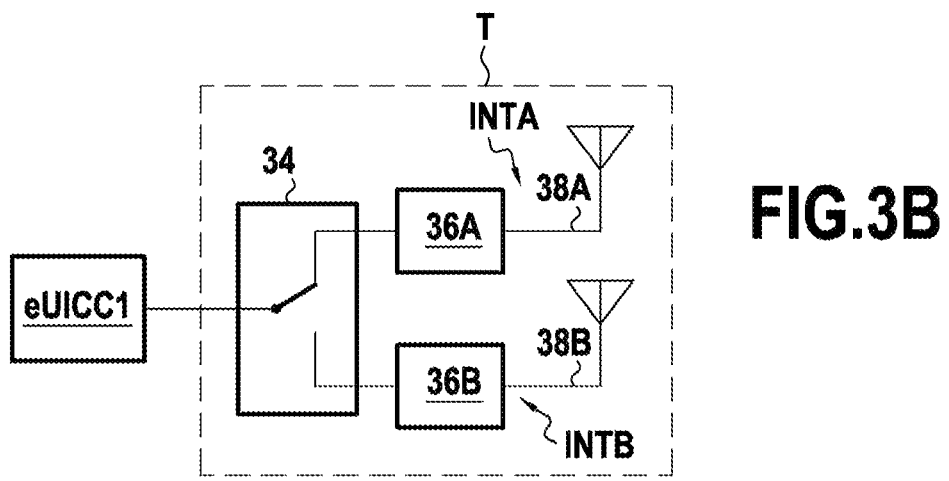
FIG. 3B is a diagram showing an embodiment of the terminal.

Nevertheless, it is possible to envisage including a plurality of radio interfaces INT in the terminal T. FIG. 3B shows an example of an embodiment in which the terminal T has a switch 34 suitable for switching communications between the module eUICC1 and two radio interfaces INTA and INTB of the terminal T. The radio interface INTA (or INTB) in this example comprises a radio transceiver unit 36A (or 36B) coupled to an antenna 38A (or 38B). In this embodiment, the switch 34 can direct each command CMD received by one of the radio interfaces INTA, INTB to the module eUICC1. When a channel between the module eUICC1 and one of the radio interfaces is in use, the other channel between the module eUICC1 and the other radio interface is not available.

As mentioned above, a communication profile P that is active in the module eUICC1 is not suitable for setting up communication between the terminal T and an associated mobile network R unless the profile P has access to the radio resources of the terminal T (i.e. the radio interfaces).

In a particular embodiment, the terminal T is suitable for time multiplexing data that is sent or received by the various profiles P in the module eUICC1.

Figure 4:
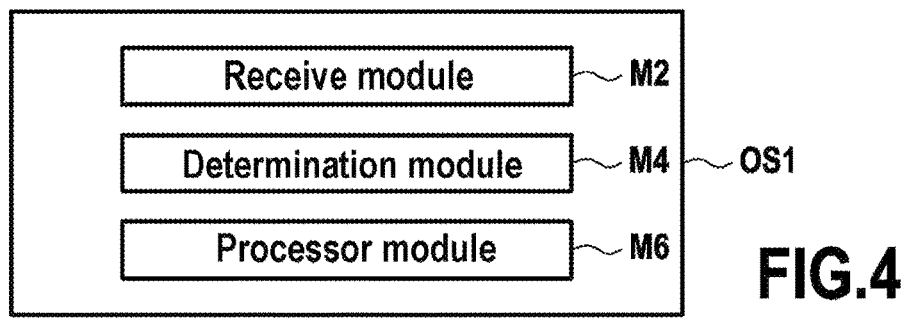
FIG. 4 is a diagram showing modules implemented respectively in the FIG. 2 embedded subscriber identity module and in a server shown in FIG. 2, in accordance with a particular embodiment of the invention.

As shown in FIG. 4, the operating system OS1 of the module eUICC1 in this example deploys a certain number of modules, namely: a receive module M2, a determination module M4, and a processor module M6.

More particularly, the receive module M2 is suitable for receiving from the communications terminal T a command referenced CMD that has one of the communication profiles P as its destination, referred to as the destination profile, that is active in the module eUICC1.

The determination module M4 is configured to determine the destination profile from among the active communication profiles P on the basis of a destination profile identifier included in each received command CMD.

Furthermore, in this example, the processor module M6 is configured to direct each received command CMD to the destination profile determined by the determination module M4.

It can be understood that the above definition of the modules M2, M4, and M6 constitutes merely one non-limiting embodiment of the invention. At least two of the modules may in particular constitute a single module deployed in the module eUICC1.

Figure 5:
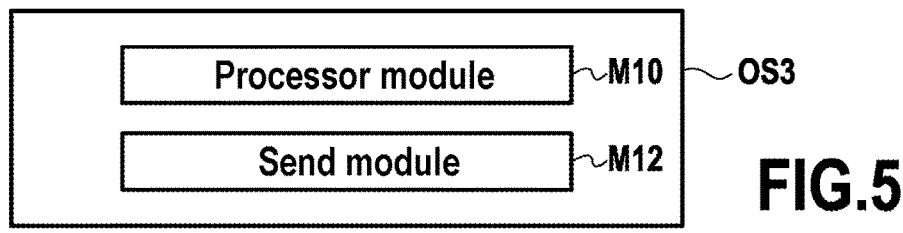
FIG. 5 is a diagram showing modules implemented respectively in the FIG. 2 embedded subscriber identity module and in a server shown in FIG. 2, in accordance with a particular embodiment of the invention.

As shown in FIG. 5, in this example, the operating system OS3 of the content management server SR1 deploys a processor module M10 and a send module M12.

More particularly, the processor module M10 is configured to include, in a command CMD for sending to the module eUICC1, an identifier of a communication profile P that is the destination for the command CMD.

The send module M12 is also configured to send the command CMD including said identifier to the module eUICC1, the destination of said command CMD being said destination profile.

Since the content management server SR2 is identical to the content management server SR1, it is not described in greater detail in this disclosure.

It can be understood that the above definition of the modules M10 and M12 constitutes no more than a non-limiting embodiment of the invention. At least two of the modules may in particular form a single module deployed in the content management server.

Figure 6:
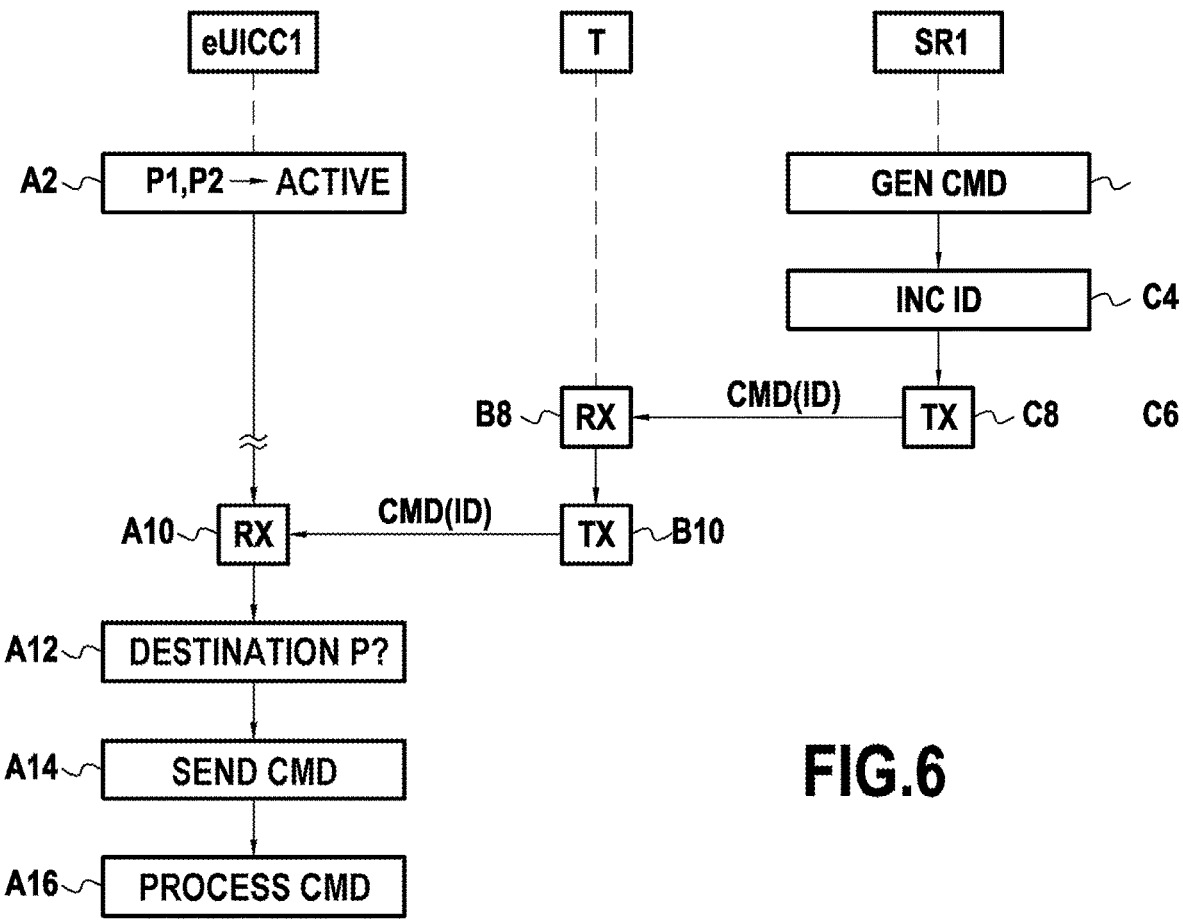
FIG. 6 is a flow chart showing the main steps of a processing method and the main steps of a sending method in accordance with a particular implementation of the invention.

With reference to the flow chart of FIG. 6, there follows a description of a particular implementation of the invention, implemented in particular by the module eUICC1 and by the remote content management server SR1. For this purpose, the module eUICC1 executes the operating system OS1 to perform a processing method in a particular implementation, and the content management server SR1 executes the operating system OS3 in order to perform a send method in a particular implementation.

It is assumed at this point that the communication profiles P1 and P2 have already been activated in the module eUICC1. In this example, each profile activation may be performed by the privileged secure domain ISD-R in response to an activation request sent by the SM-SR server associated with the profile P in question. It is assumed that the module eUICC1 maintains (A2) the profiles P1 and P2 in the active state throughout this example of a processing method.

During a generation step C4, the content management server SR1 generates a command CDM for the communication profile P1 that is active in the module eUICC1. By way of example, this command CMD is of the APDU type in compliance with the standard ISO 7816-4.

In a particular example, the command CMD is an APDU command of envelope type, possibly containing at least one command (update a file . . . ) for an active profile in the module eUICC1.

During an inclusion step C6, the content management server SR1 includes, in the command CMD, an identifier ID of the profile P that is the destination for said command CMD (namely the profile P1 in this example). As specified below, this identifier ID may take various forms depending on the circumstances of use.

During a send step C8, the content management server SR1 sends the command CMD including the identifier ID to the terminal T. Once received (B8), the terminal T transfers (B10) the command CMD to the module eUICC1, which command is for the profile P identified by the identifier ID.

The module eUICC1 receives the command CMD during a receive step A10.

Thereafter, the module eUICC1 determines (A12) the active profile P that is the destination for the command CMD, on the basis of the identifier ID that is included in the command CMD.

During a send step A14, the module eUICC1 sends the command CMD to the destination profile P as determined in step A12. The module eUICC1 is thus suitable for switching a receive command to the appropriate active profile P.

In response to the receive command CMD, the destination profile P performs the appropriate processing A16 relating to the received command.

In this implementation, the inclusion and send steps C6 and C8 are respectively performed by the modules M10 and M12 of the content management server SR1. Likewise, the receive, determination, and send steps A10, A12, and A14 are performed respectively by the modules M2, M4, and M6.

The content management server SR2 may be configured to perform the send method of the invention in the same manner as the remote server SR1.

In a particular implementation, the command CMD sent in C8 by the content management server SR1 and processed by the module eUICC1 is an APDU command in compliance with the standard ISO 7816-4.

As mentioned above, the identifier ID of the destination active profile for the command CMD may take various forms, depending on the circumstances of use.

In a particular implementation, the identifier ID of the destination profile is included in the CLA class octet of the command CMD, as defined by the standard ISO 7816-4.

Figures 7, 8:
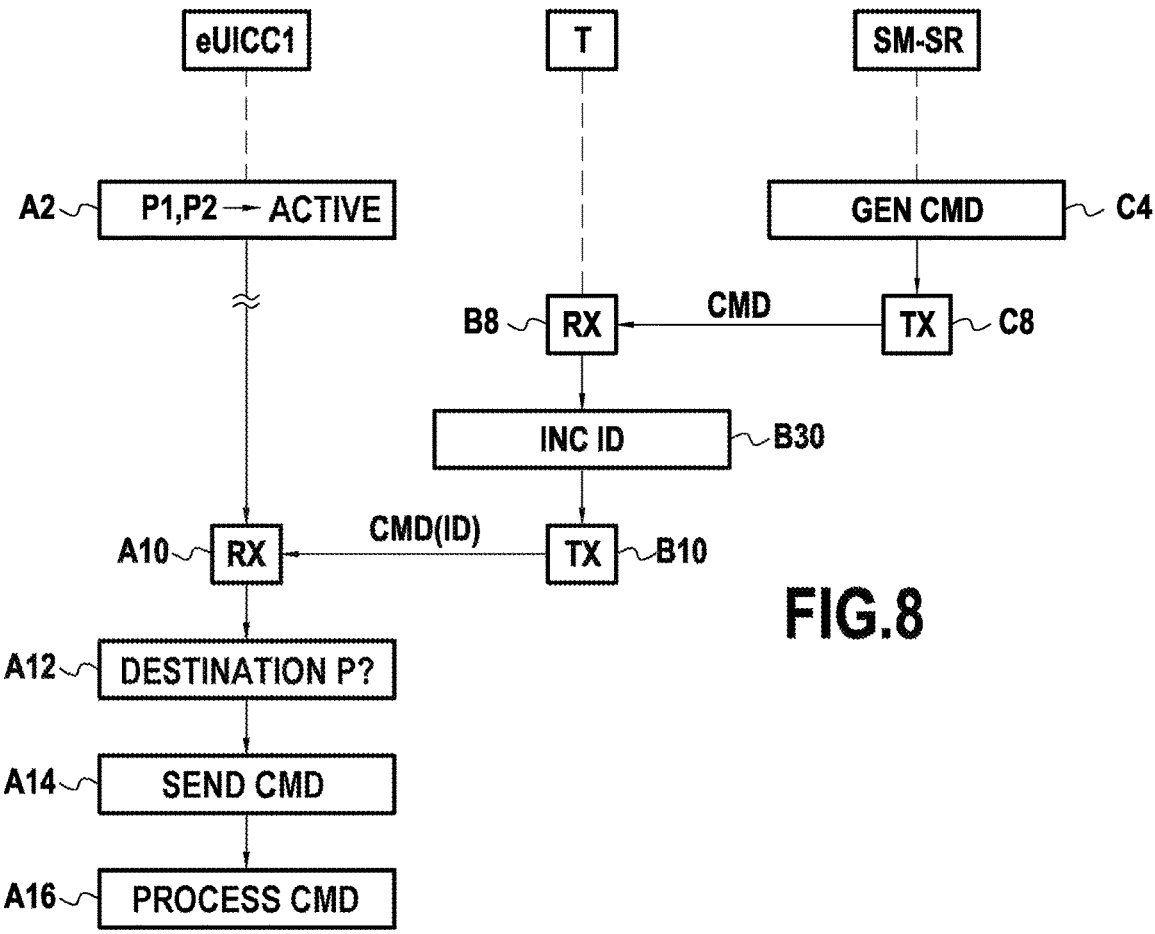
FIG. 7 is a diagram showing the use of certain bits of the CLA class octet of an APDU command in particular implementations of the invention.
FIG. 8 is a flow chart showing the main steps of a processing method and the main steps of a sending method in accordance with a variant of the implementation shown in FIG. 6.

FIG. 7 is a diagram showing the sates of the bits of the CLA class octet of the command CMD in various implementations.

In a particular implementation, the identifier ID of the destination profile is coded on the basis of bit 5 (written b5) of the CLA class octet of the command CMD. In other words, the content management server SR1 is configured to format the command CMD for sending to the terminal T by coding the identifier ID using bit 5 of the CLA class octet of the command CMD. In accordance with the standard ETSI 102221, bit 5 of the CLA class octet does not have any predefined use. In this particular implementation, the invention thus proposes making advantageous use of this bit 5 of the CLA octet for the purpose of identifying the active profile P that is the destination for the command under consideration.

In a particular implementation, bit 5 of the CLA class octet of a command CMD may switch between a first state '0' and a second state '1', the determination module M4 being configured to determine that the first active communication profile P1 in the module eUICC1 is the destination of a command CMD when the bit 5 is in the '0' state, and to determine that the second active communication profile P2 is the destination for the command CMD when the bit 5 is in the '1' state, said profiles P1 and P2 being distinct from each other.

Using bit 5 serves advantageously to distinguish incoming traffic to the module eUICC1, having either a first profile P1 or else a second profile P2 as its destination. Nevertheless, it should be observed that only one bit is used in this example (which bit can take on only the state '0' or '1') which means that it is not possible to distinguish between more than two different active profiles.

This implementation presents in particular the advantage that it can make use of two active profiles P simultaneously, while giving each profile P access to a radio interface INTA, INTB as shown in FIG. 3B. In contrast, if only one radio interface INT is available in the terminal T (as shown in FIG. 3A), then only the active profile P having access to the radio interface INT at a given instant is suitable for setting up communication between the terminal T and the mobile network (R1 or R2) associated with said profile.

Nevertheless, it should be observed that according to the standard ISO 7816, bit 5 may be used for the "command chaining function" when said function is supported by the eUICC module. Thus, when bit 5 of the CLA octet is used to identify the destination profile P, the "command changing control" function cannot be used.

Furthermore, in the above-described implementation, it is the content management servers SR1 and SR2 that perform the send method of the invention. Nevertheless, it can be understood that the send method of the invention may be performed by some other entity, depending on circumstances.

In a particular implementation, the identifier ID of the destination active profile is included by the terminal T after receiving the command. In other words, it is the terminal T that performs the send method of the invention, in which the terminal T includes an identifier ID of a destination active profile of a command CMD in that command within the module eUICC1. By way of example, the identifier ID is coded using bit 5 of the CLA class octet of the command CMD. Once the identifier ID has been included, the terminal sends the command including the identifier ID to the module eUICC1 so that it directs the command to the destination profile on the basis of the identifier ID.

As shown by way of example in FIG. 2, when the active profile P of the module eUICC1 communicates with the terminal T, it does so using the ISO 7816 interface represented by the connection L. According to the standard ISO 7816, four different logic channels may normally be used for communication between the module eUICC1 and the terminal T, the logic channel in use being identified in each APDU command with the bits 1 and 2 of the CLA class octet. An active profile P receiving an APDU command can thus take cognizance of the logic channel being used by the transmission over the connection L.

As shown in FIG. 7, the four logic channels normally available via the connection L between the module eUICC1 and the terminal T are written CH0, CH1, CH2, and CH3 in this example.

With reference to FIG. 8, there follows a description of a variant of the implementation described above with reference to FIG. 6. In this variant, the send method is performed by the terminal T and not by the content management server SR1 or SR2.

In this particular implementation, the content management server SR1 generates (C4) a command CMD as described above with reference to FIG. 6. The content management server SR1 then sends (C8) the command CMD to the terminal T.

The terminal T receives the command CMD during a receive step B8. The terminal T includes (B30), in the receive command CMD, an identifier ID of the active profile P that is the destination for the command CMD within the module eUICC1.

In this implementation, the identifier ID of the profile that is the destination of the command CMD is coded on the basis of bits 1 and 2 of the CLA class octet of said command (FIG. 7). In other words, the terminal T is configured to format the command CMD as received from the content management server SR1 by coding the identifier ID using bits 1 and 2 of the CLA class octet. This particular implementation thus advantageously makes use of the two bits b1 and b2 that are normally dedicated to identifying the logic channel used over the connection L, for the purpose of identifying the active profile P that is the destination of an APDU command. In this particular embodiment, the terminal T allocates one or more combinations of the states of the bits 1 and 2 (CH0 to CH3) to a given profile P.

In a particular implementation, bits 1 and 2 of the CLA class octet of a command CMD may each switch between a first state '0' and a second state '1', the determination module M4 being configured to determine the destination profile P from the state in which said bits 1 and 2 of the command CMD are to be found.

In a first particular implementation, the terminal T is configured to allocate the same logic channel(s) always to the same active profile in the eUICC module. In other words, each active profile in the eUICC module is always given the same logic channel(s) by the terminal T (e.g. the channel CH0 for a profile P1 and the channels CH1 and CH2 for the profile P2). In a variant implementation, the terminal is configured to allocate the logic channels in dynamic manner to the profiles that are active.

The use of bits 1 and 2 of the CLA class octet in the context of the invention is advantageous in that it makes it possible, if necessary, to identify more than two distinct destination profiles P. Furthermore, this implementation allows the "command chaining control" function to be used in compliance with the GSMA standard.

As shown in FIG. 8, the terminal T then sends (B10), to the module eUICC1, the command CMD containing the identifier ID of the destination active profile P. The module eUICC1 receives the command CMD during a receive step A10 and it performs the steps A12, A14, and A16 as described above with reference to FIG. 6.

In a particular implementation, the module eUICC1 is suitable for interpreting the identifier ID of the destination profile on the basis of bit 5 of the CLA class octet in accordance with the standard ISO 7816-4 and/or on the basis of bits 1 and 2 of the CLA class octet in accordance with standard ISO 7816-4.

The present invention makes it possible to direct each command received by an eUICC module to the appropriate active communication profile. By means of the invention, an eUICC module can thus maintain a plurality of profiles in the active state. In this way, it is possible to activate a plurality of profiles at the same time and avoid sending activation and deactivation requests from the mobile network servers SM-SR, thereby limiting traffic and network resources.

By way of example, the present invention makes it possible within an eUICC module to use a first subscription (associated with a first profile) in order to perform communication of "voice" type, and simultaneously to use a second subscription (associated with another profile) in order to perform communication of a "data" type. Other hybrid uses of a plurality of active profiles at the same time are possible within the context of the invention, such as for example:
- using different subscriptions as a function of the time of day;
- using different subscriptions depending on whether a call via the terminal is incoming or outgoing; or indeed
- using different subscriptions depending on whether a call is national or international.

A person skilled in the art understands that the above-described embodiments and variants merely constitute non-limiting examples of how the invention may be implemented. In particular, a person skilled in the art may envisage any adaptation or combination of the above-described embodiments and variants in order to satisfy any particular need.

The invention claimed is:

1. An embedded subscriber identity module suitable for co-operating with a communications terminal, the module comprising:
    a plurality of communication profiles, at least two of said communication profiles being active at the same time so as to allow the communications terminal to communicate with each mobile telephone network associated with said at least two active communication profiles;
    a receive module for receiving, from the communications terminal, a command that has one of the at least two active communication profiles as a destination, wherein the one of the at least two active communication profiles is referred to as the destination profile; and a determination module for determining the destination profile from among the at least two active communication profiles on the basis of one or more bits included in said command, wherein said command is an application protocol data unit (APDU) command, and wherein the destination profile identifier of the destination profile is included in a CLA class byte of the APDU command, and wherein the CLA class byte is generated by replacing one or more bits of the CLA class byte dedicated for identifying a logic channel with one or more bits indicative of the destination profile corresponding to the destination of the ADPU command.

2. The embedded subscriber identity module according to claim 1, further comprising a processor module for directing the command to said destination profile.

3. The embedded subscriber identity module according to claim 1, wherein the communications terminal comprises at least one radio interface, at least one active communication profile of the at least two active communication profiles having access to said at least one radio interface in order to enable communication to be set up between the communications terminal and the mobile telephone network associated with said at least one active communication profile.

4. The embedded subscriber identity module according to claim 1, wherein the destination profile identifier of the destination profile is coded at bit 5 of the CLA class byte.

5. The embedded subscriber identity module according to claim 4, wherein bit 5 of the CLA class byte can switch between a first state and a second state, the determination module being configured to determine that a first active communication profile in the embedded subscriber identity module is the destination of said command when the bit 5 is in the first state, and to determine that a second active communication profile in the embedded subscriber identity module is the destination of said command when the bit 5 is in the second state, said first active communication profile and said second active communication profile being distinct from each other.

6. The embedded subscriber identity module according to claim 1, wherein the destination profile identifier of the destination profile is coded at bits 1 and 2 of the CLA class byte.

7. The embedded subscriber identity module according to claim 6, wherein the bits 1 and 2 of the CLA class byte can each switch between a first state and a second state, the determination module being configured to determine the destination profile on the basis of the states in which said bits 1 and 2 are set in the APDU command.

8. A device suitable for sending a command to an embedded subscriber identity module co-operating with a communications terminal, the device comprising:

a send module for sending the command to one of a plurality of active communication profiles that are active at the same time in the embedded subscriber identity module, each active communication profile enabling the communications terminal to communicate with a respective mobile telephone network; and a processor module configured, prior to sending the command, to include an identifier of an active communication profile that is the destination for said command, wherein said command is an application protocol data unit (APDU) command and wherein the identifier of the active communication profile is included in a CLA class byte of the APDU command, the CLA class byte being modified by replacing one or more bits dedicated for identifying a logic channel with one or more bits indicative of the active communication profile corresponding to the destination of the ADPU command.

9. The device according to claim 8, wherein said device is the communications terminal or a remote content management server in accordance with the standard GSMA SGP.02 v3.0.

10. A system comprising:

a communications terminal;

an embedded subscriber identity module that co-operates with the communications terminal, the module comprising:

a plurality of communication profiles, at least two of said communication profiles being active at the same time so as to allow the communications terminal to communicate with each mobile telephone network associated with said at least two active communication profiles;

a receive module for receiving, from the communications terminal, a command that has one of the at least two active communication profiles as a destination, wherein the one of the at least two active communication profiles is referred to as the destination profile; and a determination module for determining the destination profile from among the at least two active communication profiles on the basis of one or more bits included in said command, wherein said command is an application protocol data unit (APDU) command, and wherein the destination profile identifier of the destination profile is included in a CLA class byte of the APDU command, the CLA class byte being modified by replacing one or more bits dedicated for identifying a logic channel with one or more bits indicative of the destination profile corresponding to the destination of the ADPU command;

and at least one device comprising:

a send module that sends the command to one of the at least two active communication profiles that are active at the same time in the embedded subscriber identity module, each active communication profile enabling the communications terminal to communicate with a respective mobile telephone network; and a processor module that, prior to sending the command, modifies the one or more bits of the CLA byte of the APDU command to indicate the destination profile.

11. A processing method implemented by an embedded subscriber identity module co-operating with a communications terminal, the method comprising-:

maintaining at least two active communication profiles in the activated state at the same time, whereby each active communication profile enables the communications terminal to communicate with a respective mobile telephone network associated with said active communication profile;

receiving, from the communications terminal, a command that has one of the at least two active communication profiles as a destination, wherein the one of the at least two active communication profiles is referred to as the destination profile; and determining the destination profile from among said at least two active communication profiles on the basis of one or more bits included in a CLA byte of said command, wherein said command is an application protocol data unit (APDU) command, and wherein the one or more bits are indicative of the destination profile, the CLA class byte being modified by replacing one or more bits dedicated for identifying a logic channel with the one or more bits indicative of the destination profile corresponding to the destination of the ADPU command.

12. A sending method implemented by a device for sending a command to an embedded subscriber identity module co-operating with a communications terminal, the method comprising:
including, in a command, an identifier of a destination communication profile from among a plurality of active communication profiles that are active at the same time in the embedded subscriber identity module, each active communication profile enabling the embedded subscriber identity module to communicate, via the communications terminal, with a respective mobile telephone network; and
sending said command, to the communications terminal, to the destination communication profile from among the plurality of active communication profiles in the embedded subscriber identity module, wherein said command is an application protocol data unit (APDU) command, and wherein the destination communication profile is identified by one or more bits included in a CLA class byte of the APDU command, the CLA class byte being modified by replacing one or more bits of the CLA class byte dedicated for identifying a logic channel with one or more bits indicative of the destination communication profile corresponding to a destination of the ADPU command.

13. A non-transitory computer readable data medium on which there is stored a computer program including instructions that, when executed by a processor of an embedded subscriber identity module, cause the embedded subscriber identity module to perform operations comprising:
maintaining at least two active communication profiles in an activated state at the same time, whereby each active communication profile enables a communications terminal to communicate with a respective mobile telephone network associated with the active communication profile;
receiving, from the communications terminal, a command that has one of the at least two active communication profiles as a destination, wherein the one of the at least two active communication profiles is referred to as the destination profile; and
determining the destination profile from among the at least two active communication profiles on the basis of one or more bits indicative of the destination profile included in a CLA byte of the command, wherein said command is an application protocol data unit (APDU) command, the CLA class byte being modified by replacing one or more bits dedicated for identifying a logic channel with the one or more bytes indicative of the destination profile corresponding to the destination of the ADPU command.

* * * * *